(12) United States Patent
Kawamura

(10) Patent No.: US 9,030,135 B2
(45) Date of Patent: May 12, 2015

(54) ELECTRICALLY OPERATED POWER STEERING DEVICE

(71) Applicant: JTEKT Corporation, Osaka-shi, Osaka (JP)

(72) Inventor: Hiroshi Kawamura, Okazaki (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 14/342,633

(22) PCT Filed: Oct. 26, 2012

(86) PCT No.: PCT/JP2012/077685
§ 371 (c)(1),
(2) Date: Mar. 4, 2014

(87) PCT Pub. No.: WO2013/069473
PCT Pub. Date: May 16, 2013

(65) Prior Publication Data
US 2014/0217940 A1    Aug. 7, 2014

(30) Foreign Application Priority Data

Nov. 7, 2011   (JP) ................................. 2011-243377
Nov. 28, 2011  (JP) ................................. 2011-259073
Dec. 5, 2011   (JP) ................................. 2011-265847

(51) Int. Cl.
*H02P 1/00*     (2006.01)
*H02P 6/08*     (2006.01)
*B62D 5/04*     (2006.01)

(52) U.S. Cl.
CPC ............... *H02P 6/08* (2013.01); *B62D 5/0484* (2013.01); *B62D 5/0481* (2013.01)

(58) Field of Classification Search
USPC ................. 318/432, 434, 139, 800, 801, 727, 318/400.26, 400.3
See application file for complete search history.

(56) References Cited

U.S. PATENT DOCUMENTS

| 6,308,140 B1 * | 10/2001 | Dowling et al. ................. 702/60 |
| 7,106,012 B2 * | 9/2006  | Matsuda et al. ............... 318/139 |
| 7,202,621 B2 * | 4/2007  | Tsunoda ....................... 318/434 |
| 2005/0264248 A1 | 12/2005 | Tsunoda |
| 2005/0269151 A1 | 12/2005 | Miyaura |

(Continued)

FOREIGN PATENT DOCUMENTS

| JP | A-2005-324622 | 11/2005 |
| JP | A-2005-343323 | 12/2005 |

(Continued)

OTHER PUBLICATIONS

International Preliminary Report on Patentability issued in International Patent Application No. PCT/JP2012/077685 dated May 13, 2014.
International Search Report issued in International Application No. PCT/JP2012/077685 mailed Jan. 29, 2013.

*Primary Examiner* — Rina Duda
(74) *Attorney, Agent, or Firm* — Oliff PLC

(57) ABSTRACT

An electric power steering apparatus includes an EPS actuator that applies assist force to a steering system, and an ECU that controls operation of the EPS actuator. The ECU includes an inverter device, a gate driver circuit, a gate driver power source, a microcomputer, and the like. The microcomputer switches assist control to assist stop control, based on an indication of a voltage decrease in the gate driver power source.

6 Claims, 13 Drawing Sheets

(56) References Cited

U.S. PATENT DOCUMENTS

| | | | |
|---|---|---|---|
| 2006/0049788 A1 | 3/2006 | Kifuku et al. | |
| 2007/0205733 A1 | 9/2007 | Kawada et al. | |
| 2011/0010052 A1* | 1/2011 | Limpibunterng et al. | 701/41 |
| 2012/0273290 A1* | 11/2012 | Kawano et al. | 180/443 |
| 2013/0181639 A1* | 7/2013 | Yamanaka et al. | 318/139 |

FOREIGN PATENT DOCUMENTS

| | | |
|---|---|---|
| JP | A-2006-76333 | 3/2006 |
| JP | A-2007-60771 | 3/2007 |
| JP | A-2009-126319 | 6/2009 |
| JP | A-2011-156988 | 8/2011 |

* cited by examiner

ELECTRICALLY OPERATED POWER STEERING DEVICE

FIELD OF THE INVENTION

The present invention relates to an electric power steering apparatus.

BACKGROUND OF THE INVENTION

In recent years, vehicles have been equipped with power steering apparatus for assisting a driver's steering operation. As a power steering apparatus, an electric power steering apparatus (EPS) is widely used, which has a brushless DC motor serving as a drive source. Generally, an EPS incorporates an inverter device for driving a brushless DC motor.

Power for an inverter device is supplied by a battery mounted in a vehicle. The inverter device comprises six semiconductor switching elements (FETs): three on the battery side, and three on the ground side. In order to drive the three FETs on the battery side, voltage higher than the battery voltage has to be supplied to the respective gates of these FETs. For this reason, an EPS includes a gate driver power source separately from the battery.

However, the conventional EPS is not provided with a means for specifying whether abnormality is caused by an FET or by a gate driver in a case where any abnormality occurs in motor control. Therefore, for example, in a case where only one phase of a brushless DC motor is disconnected due to an FET malfunction, assist control has to be stopped even though assist control using the remaining normal phases is possible. In a word, in the conventional EPS, control of switching between assist control and assist stop control is not appropriately exerted depending on a factor of abnormality in motor control.

SUMMARY OF THE INVENTION

It is an object of the present invention to provide an electric power steering apparatus able to appropriately exert control of switching between assist control and assist stop control depending on a factor of abnormality in motor control.

To solve the foregoing problem, according to the first aspect of the present invention, an electric power steering apparatus is provided, which comprises: a motor configured to apply assist force to a steering system; a torque sensor configured to detect steering torque applied to the steering system; an inverter device including a semiconductor switching element and configured to drive the motor by driving the semiconductor switching element; a gate driver power source configured to supply power to a gate driver circuit that drives the inverter device; and controller configured to control the inverter device based on the steering torque. Based on an indication of a voltage decrease in the gate driver power source, the controller switches assist control, for applying the assist force to the steering system, to assist stop control, for stopping the assist control.

In this configuration, based on an indication of a voltage decrease in the gate driver power source, assist control can be switched to assist stop control. With thus determining the state of the voltage of the gate driver power source, in a case where a factor other than abnormality in the voltage of the gate driver power source is present, for example, where only one phase of a brushless DC motor is disconnected, but assist control using the remaining normal phases is possible, assist control can be continued. Therefore, depending on a factor of abnormality in motor control, switching between assist control and assist stop control can be controlled appropriately.

In the foregoing electric power steering apparatus, the indication of the voltage decrease in the gate driver power source is given by the difference between the voltage of the gate driver power source and the power source voltage of the inverter device. It is preferable that if the voltage of the gate driver power source is equal to or higher than a voltage threshold value with respect to the power source voltage of the inverter device, the controller exerts assist control, and if not equal to or higher than the voltage threshold value, the controller exerts assist stop control.

In this configuration, the indication of the voltage decrease in the gate driver power source is given by the difference between the voltage of the gate driver power source and the power source voltage of the inverter device. Accordingly, based on whether or not the voltage of the gate driver power source is maintained at a higher level than the power source voltage of the inverter device, the state of the voltage of the gate driver power source can be determined. Thus, an area of voltage where assist control is possible can be broadened, in comparison with the case of switching between assist control and assist stop control based only on the voltage of the gate driver power source. Additionally, in this configuration, the voltage decrease of the gate driver power source with respect to the power source voltage of the inverter can be determined based on the voltage threshold value. That is, the voltage of the gate driver power source can be divided into an area of normal voltage and an area of voltage lower than a normal value. Thus, since the area of voltage in the gate driver power source can be divided using the threshold value, control of switching between assist control and assist stop control can be exerted more accurately.

In the foregoing electric power steering apparatus, the indication of the voltage decrease in the gate driver power source is given by the voltage of the gate driver power source. It is preferable that if the voltage of the gate driver power source is equal to or higher than a voltage threshold value, the controller exerts assist control, and if lower than the voltage threshold value, the controller exerts assist stop control.

In this configuration, the voltage decrease in the gate driver power source is determined based on the voltage threshold value. Thereby, the same advantageous effects as those of the invention described in claim 2 can be yielded.

In the foregoing electric power steering apparatus, it is preferable that the controller exerts assist limit control in which assist control is exerted while limiting an electric current command value corresponding to a target assist force, and that the controller exerts the assist limit control based on the indication of the voltage decrease in the gate driver power source.

In this configuration, the controller is able to exert assist limit control based on the indication of the voltage decrease in the gate driver power source. Thus, in an area of voltage where the voltage of the gate driver power source is slightly lower than a normal value, assist limit control is exerted, thereby restricting the value of the electric current flowing in the motor. Thus, the semiconductor switching element of the inverter device can be prevented from overheating and thereby leading to malfunction.

In the foregoing electric power steering apparatus, it is preferable that the controller exerts assist control if the indication of the voltage decrease in the gate driver power source is equal to or greater than a first voltage threshold value, exerts assist limit control if the indication is less than the first voltage threshold value but greater than a second voltage threshold value that is smaller than the first voltage threshold value, and exerts assist stop control if the indication is equal to or less than the second voltage threshold value.

In this configuration, the state of the voltage of the gate driver power source can be determined based on the first voltage threshold value and the second voltage threshold value set smaller than the first voltage threshold value. That is, the voltage of the gate driver power source can be divided into an area of normal voltage, an area of voltage slightly lower than a normal value, and an area of voltage significantly lower than the normal value. Since the voltage area of the gate driver power source is divided using the two threshold values, control of switching between assist control, assist limit control, and assist stop control can be exerted more accurately.

In the foregoing electric power steering apparatus, it is preferable that the controller decreases drive frequency of the semiconductor switching element based on the indication of the voltage decrease in the gate driver power source.

In this configuration, the drive frequency of the semiconductor switching element is decreased based on the indication of the voltage decrease in the gate driver power source, thus making it possible to prevent the semiconductor switching element of the inverter device from overheating and thereby leading to malfunction. That is, the same advantageous effects can be yielded as those in assist limit control.

In the foregoing electric power steering apparatus, it is preferable that the controller decreases the power source voltage of the inverter device based on the indication of the voltage decrease in the gate driver power source.

In this configuration, the power source voltage of the inverter device is decreased based on the indication of the voltage decrease in the gate driver power source, thus making it possible to prevent the semiconductor switching element of the inverter device from overheating and thereby leading to malfunction. That is, the same advantageous effects can be yielded as those in assist limit control.

DETAILED DESCRIPTION OF THE PREFERRED EMBODIMENTS

First Embodiment

The first embodiment in which the present invention is implemented in an electric power steering apparatus (EPS) of column type will now be described with reference to FIGS. 1 to 7.

Figure 1:
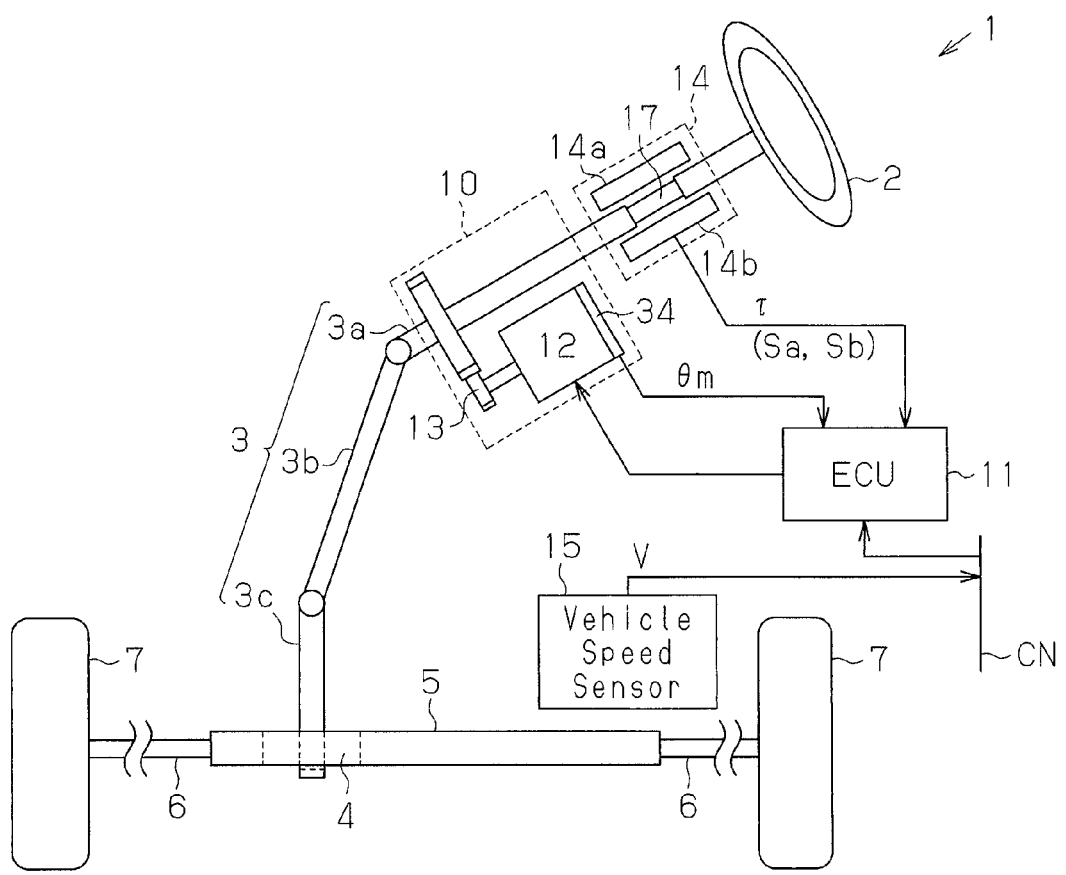
FIG. 1 is a schematic diagram of the configuration of an electric power steering apparatus according to the first embodiment of the present invention.

As shown in FIG. 1, a steering wheel 2 is fixed to a steering shaft 3 and also coupled to a rack shaft 5 via a rack and pinion mechanism 4. In response to a driver's operation of the steering wheel 2, the steering shaft 3 rotates. Then, the rotation of the steering shaft 3 is converted into reciprocal linear motion of the rack shaft 5 by the rack and pinion mechanism 4.

The steering shaft 3 includes a column shaft 3a, intermediate shaft 3b, and pinion shaft 3c coupled together. A torsion bar 17 is attached to an intermediate part of the column shaft 3a. Tie rods 6 are coupled to both ends of the rack shaft 5. The linear motion of the rack shaft 5 is transmitted to a knuckle, not shown, via the tie rods 6. Consequently, the steering angle of wheels 7 to be turned is changed, and thus the traveling direction of the vehicle is changed.

The EPS 1 includes an EPS actuator 10 and an ECU 11 for controlling operation of the EPS actuator 10. The EPS actuator 10 applies assist force to the steering system of the vehicle in order to assist a driver with operation of the steering wheel 2.

The EPS actuator 10 is configured as an EPS actuator of column type. The EPS actuator 10 includes a motor 12 serving as a drive source, and a decelerating mechanism 13 coupling the motor 12 and the column shaft 3a. As the motor 12, a brushless DC motor is employed. The EPS actuator 10 decelerates rotation of the motor 12 by the decelerating mechanism 13 and transmits the decelerated rotation to the column shaft 3a. Thus, the torque of the motor 12 is applied to the steering system as assist force.

A torque sensor 14, motor rotation angle sensor 34, and in-vehicle network CN such as CAN (Controller Area Network) are connected to the ECU 11. A signal output from a vehicle speed sensor 15 is input to the ECU 11 via the in-vehicle network CN. The torque sensor 14 is a torque sensor that outputs signals Sa and Sb from sensors in a plurality of systems. The torque sensor 14 includes a sensor core, not shown, and two sensor elements 14a and 14b. The sensor core generates a magnetic flux that changes based on torsion of the torsion bar 17. Each of the sensor elements 14a and 14b is formed from a hole IC, which is a magnetoelectric transducer, and is disposed around the sensor core. When the torsion bar 17 is twisted as a result of torque input into the steering shaft 3, a magnetic flux passed through each of the sensor elements 14a and 14b changes. The torque sensor 14 outputs voltages output from the sensor elements 14a and 14b, which have been changed with changes in magnetic flux, to the ECU 11 as sensor signals Sa and Sb, respectively.

The ECU 11 calculates target assist force based on a vehicle state quantity, which is detected by the various sensors. The ECU 11 supplies drive power to the motor 12 in order to cause the EPS actuator 10 to generate the target assist force. Thus, the ECU 11 exerts assist control to control assist force to be applied to the steering system.

Next, referring to FIGS. 2 and 3, the power source configuration and electrical configuration of the EPS 1 will be described.

Figure 2:
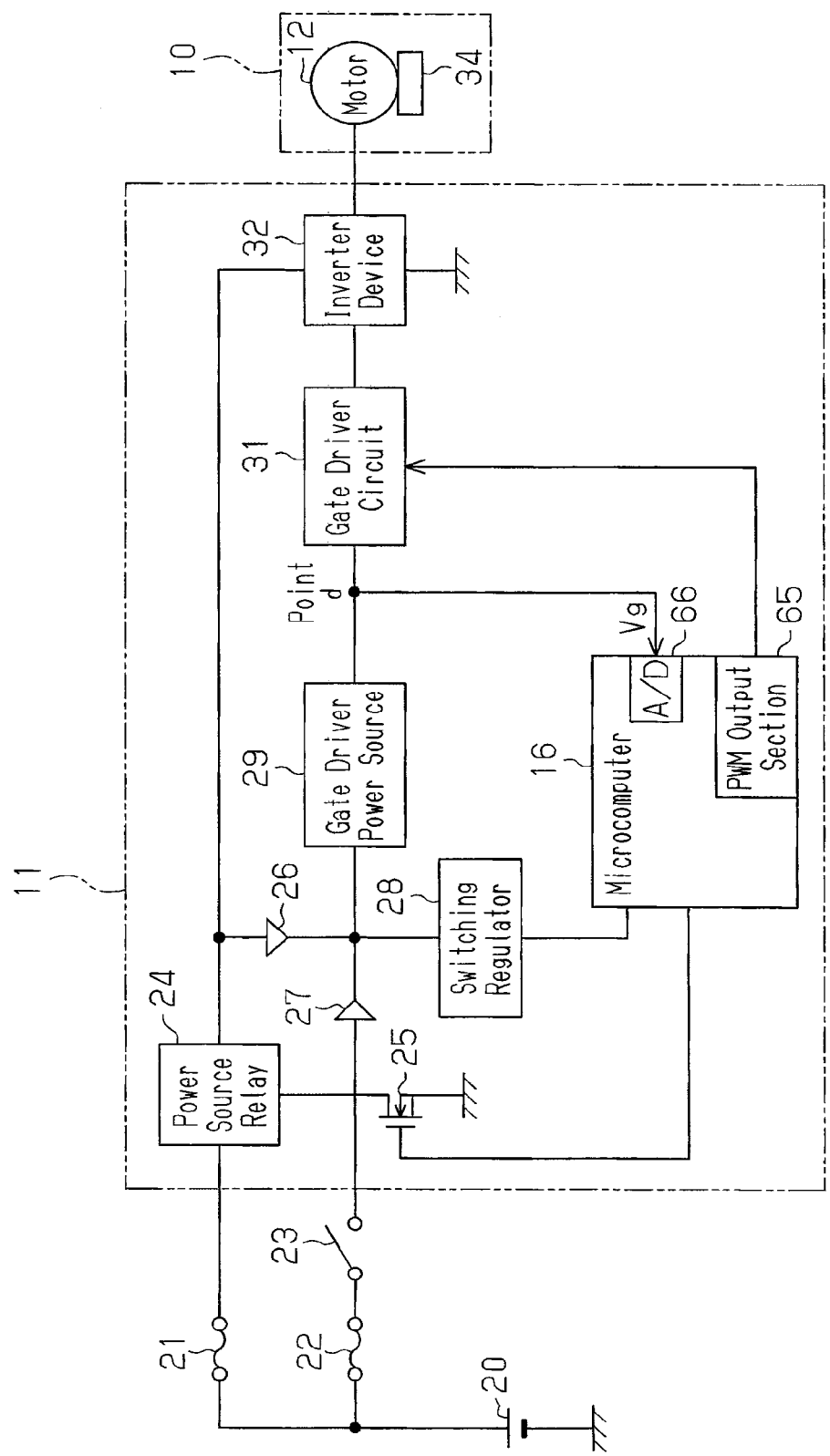
FIG. 2 is a block diagram of the configuration of the power source of the electric power steering apparatus.

As shown in FIG. 2, the ECU 11 includes a microcomputer 16, a power source relay 24, a switching regulator 28, a gate driver power source 29, a gate driver circuit 31, and an inverter device 32. Power from the battery 20 is supplied to the ECU 11 through a fuse 21, or through a fuse 22 and an ignition switch (hereinafter referred to as IGSW) 23. The fuse 21 is connected to the power source relay 24.

Between the power source relay 24 and the microcomputer 16 is an FET 25 serving as a semiconductor switching element. The FET 25 is controlled by the microcomputer 16. The power source relay 24 is opened and closed by the FET 25. The output terminal of the power source 24 is connected to a diode 26 and the inverter device 32. The output terminal of the IGSW 23 is connected to a diode 27.

The output terminal of the diode 26 is joined to the output terminal of the diode 27. Additionally, both of the diodes 26 and 27 are connected to the switching regulator 28 and the gate driver power source 29 on the output side. Power is supplied to the microcomputer 16 from the switching regulator 28. Power is supplied to the gate driver circuit 31 from the gate driver power source 29.

Voltage Vg of the gate driver power source 29 is taken into the A/D terminal 66 of the microcomputer 16 from a point d, which is midway between the gate driver power source 29 and the gate driver circuit 31. On the other hand, the microcomputer 16 outputs a motor control signal from a PWM output part 65 to the gate driver circuit 31.

Figure 3:
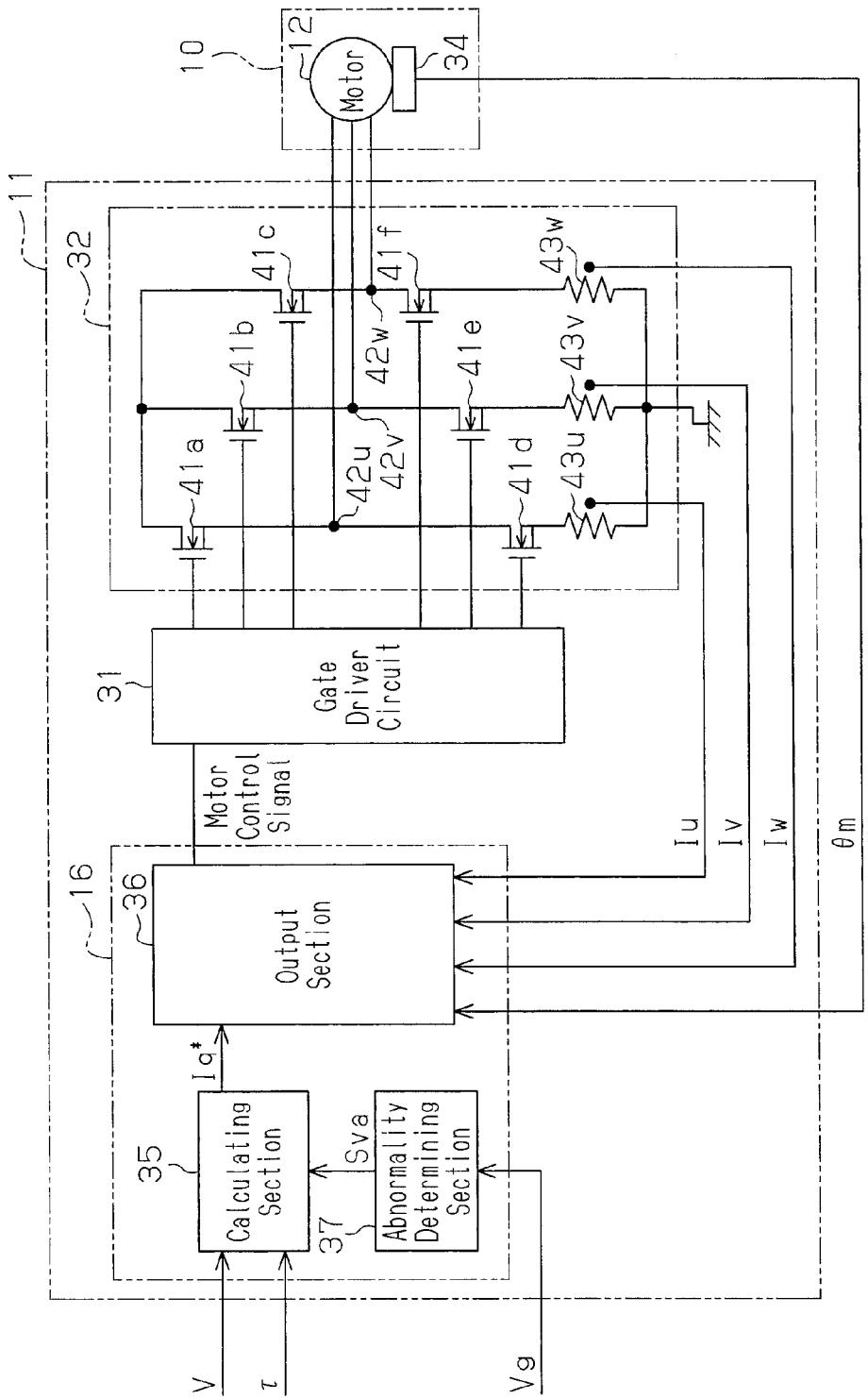
FIG. 3 is a block diagram of the electrical configuration of the electric power steering apparatus.

As shown in FIG. 3, the gate driver circuit 31 outputs a gate signal to the inverter device 32 based on the motor control signal, and drives the respective gates of the FETs included in the inverter device 32. Based on a gate signal input to the gate of each FET, the inverter device 32 supplies drive power to the motor 12. A predetermined voltage is applied to the three-phase winding of the motor 12 by the inverter device 32.

The inverter device 32 comprises six FETs, serving as semiconductor switching elements, in correspondence with the number of the phases of the motor 12. Specifically, the inverter device 32 includes a series circuit of FETs 41a and 41d, a series circuit of FETs 41b and 41e, and a series circuit of FETs 41c and 41f, which three series circuits are connected in parallel. The contact point 42u between the FETs 41a and 41d is connected to the U-phase coil of the motor 12. The contact point 42v between the FETs 41b and 41e is connected to the V-phase coil of the motor 12. The contact point 42w between the FETs 41c and 41f is connected to the W-phase coil of the motor 12.

Additionally, the inverter device 32 is provided with current sensors 43u, 43v, and 43w for detecting phase current values Iu, Iv, and Iw, respectively, flowing in the motor 12. The FETs 41d, 41e, and 41f are grounded via the current sensors 43u, 43v, and 43w, respectively. On the other hand, as shown in FIGS. 2 and 3, the FETs 41a, 41b, and 41c are connected to the battery 20 via the power source relay 24, fuse 21, and the like.

The gate driver circuit 31 converts a motor control signal output from the microcomputer 16, into a voltage at which each gate of the FETs 41a to 41f can be driven. The gate driver circuit 31 outputs, as a gate signal, the converted voltage and applies this voltage to the gate terminal of each of the FETs 41a to 41f. Thus, each of the FETs 41a to 41f is turned on/off in response to the motor control signal. As a result, a DC voltage supplied from the battery 20 is converted into drive power of three phases (U, V, and W) and this drive power is supplied to the motor 12.

The microcomputer 16 detects phase current values Iu, Iv, and Iw flowing in the motor 12 based on their respective signals output from the current sensors 43u, 43v, and 43w, respectively. The microcomputer 16 detects the motor rotation angle θm of the motor 12 based on a signal output from the motor rotation angle sensor 34. The microcomputer 16 detects steering torque τ based on sensor signals Sa and Sb output from the torque sensor 14. The microcomputer 16 detects vehicle speed V based on a signal output from the vehicle speed sensor 15 received via the in-vehicle network CN. Based on the detected phase current values Iu, Iv, and Iw, motor rotation angle θm, steering torque τ, and vehicle speed V, the microcomputer 16 generates a motor control signal and outputs this signal to the gate driver circuit 31.

The microcomputer 16 includes: a calculating section 35 that calculates an electric current command value Iq*, an output section 36 that outputs a motor control signal based on the electric current command value Iq*, and an abnormality determining section 37. The abnormality determining section 37 determines the state of the voltage Vg of the gate driver power source 29, taken from an A/D terminal 66. Specifically, the abnormality determining section 37 determines whether or not the voltage Vg is equal to or higher than a voltage threshold value $\alpha_0$. Based on the result of the determination, the abnormality determining section 37 generates a switching signal Sva for switching the electric current command value Iq* output from the calculating section 35 to the output section 36. The abnormality determining section 37 outputs the switching signal Sva indicating the state of the voltage Vg, to the calculating section 35.

Figure 4:
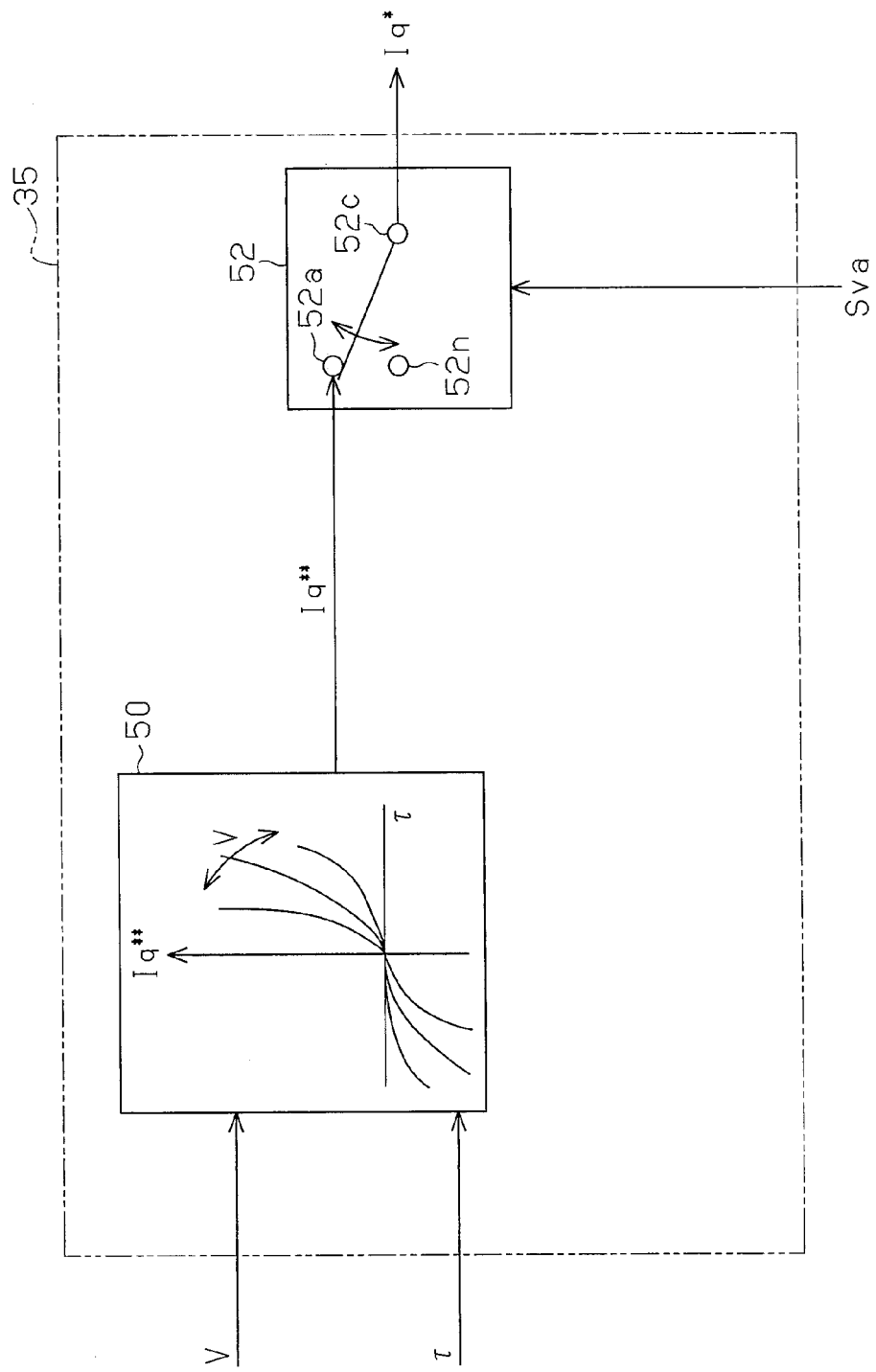
FIG. 4 is a block diagram of the electrical configuration of a calculating section of the electric power steering apparatus.
Figure 5:
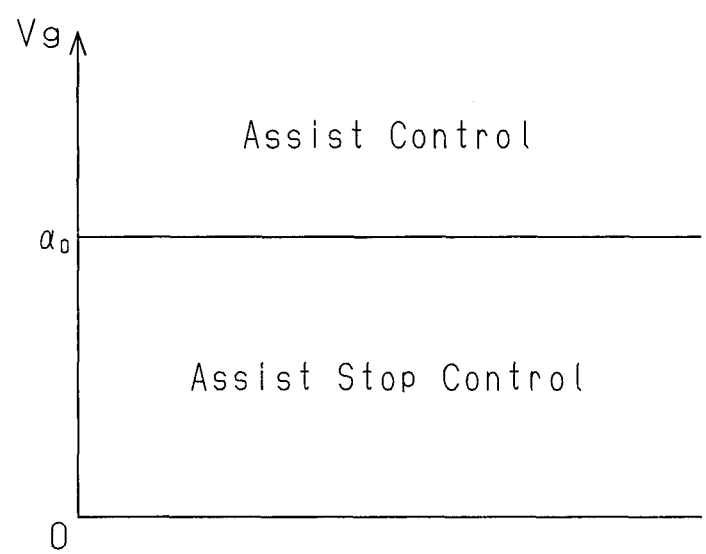
FIG. 5 is a graph showing an area of voltage where assist control is exerted and an area of voltage where assist stop control is exerted.

As shown in FIGS. 4 and 5, the calculating section 35 calculates the target assist force to be generated by the EPS actuator 10 based on steering torque τ and vehicle speed V. The calculating section 35 calculates an electric current command value Iq for motor torque corresponding to the target assist force. Therefore, the calculating section 35 has a calculation map 50 representing the relationship among steering torque τ, vehicle speed V, and electric current command value Iq. The calculating section 35 also includes a command value memory, not shown, for outputting "0" as an electric current command value Iq**. Additionally, the calculating section 35 includes a switching section 52 that operates in response to a switching signal Sva and switches the electric current command value Iq* to be output to the output section 36.

The switching section 52 includes a contact point 52a connected to the calculation map 50, a contact point 52n connected to a command value memory, and a contact point 52c connected to the output section 36. Based on a switching signal Sva from the abnormality determining section 37, the switching section 52 is switched as follows. If the voltage Vg of the gate driver power source 29 is equal to or higher than the voltage threshold value $\alpha_0$, the switching section 52 connects the contact points 52a and 52c. As a result, the electric current command value Iq** output from the calculation map 50 is output from the calculating section 35 to the output section 36 as it is, as an electric current command value Iq*.

Conversely, if the voltage Vg is lower than the voltage threshold value $α_0$, the switching section 52 connects the contact point 52n and contact point 52c. Consequently, an electric current command value Iq** (=0) output from the command value memory is output from the calculating section 35 to the output section 36 as an electric current command value Iq*. Subsequently, the microcomputer 16 exerts assist stop control and stops drive of the motor 12.

Figure 6:
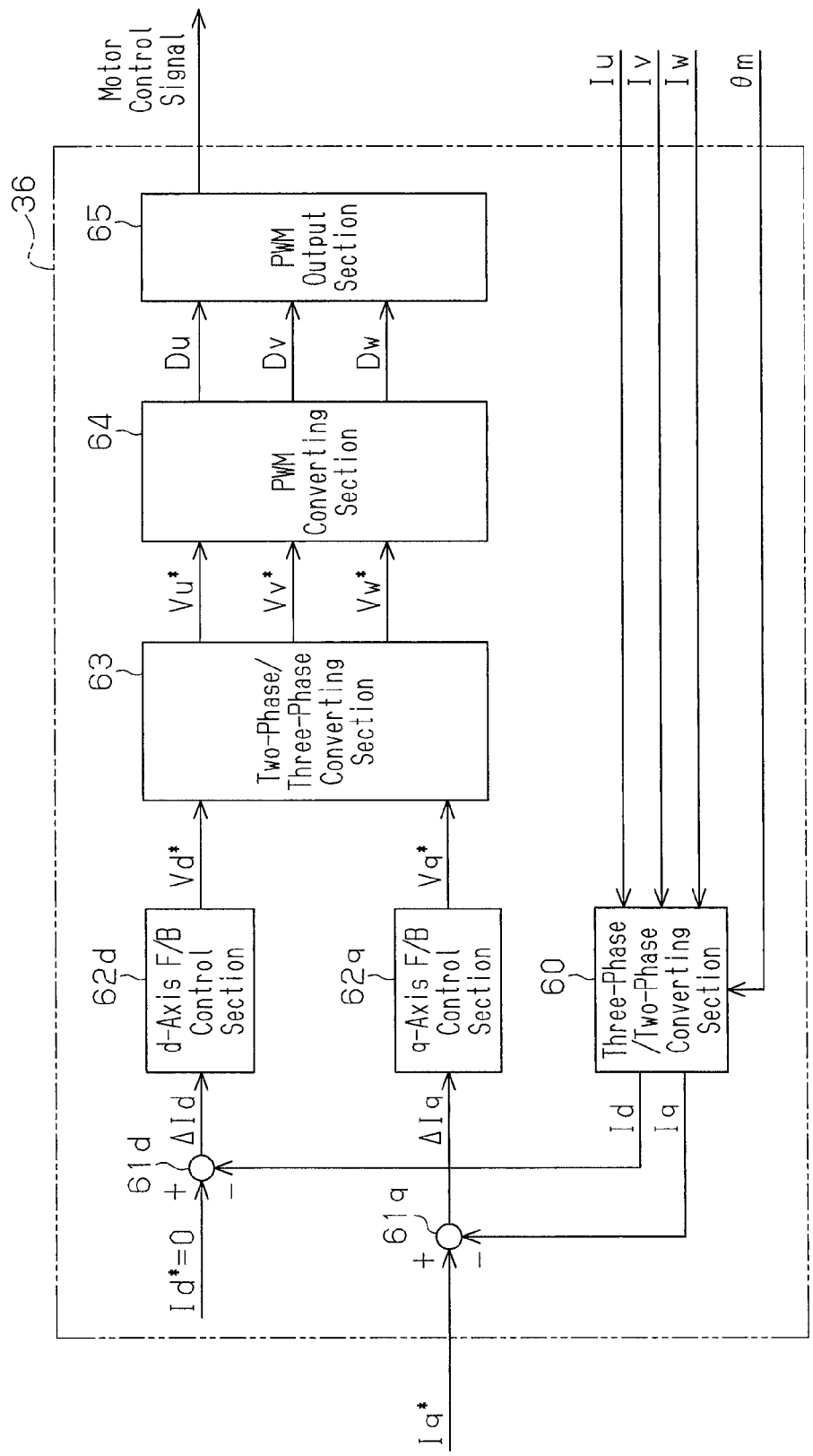
FIG. 6 is a block diagram of the electrical configuration of an output section of the electric power steering apparatus.

As shown in FIG. 6, not only an electric command value Iq* from the calculating section 35, but also phase current values Iu, Iv, and Iw and motor rotation angle θm are input to the output section 36. Specifically, the phase current values Iu, Iv, and Iw and the motor rotation angle θm are input to the three-phase/two-phase converting section 60 of the output section 36. The three-phase/two-phase converting section 60 calculates d-axis current Id and q-axis current Iq by converting the phase current values Iu, Iv, and Iw into coordinates based on the motor rotation angle θm.

A d-axis deviation calculating section 61d finds a d-axis deviation ΔId between a d-axis target current Id* (in the present embodiment, Id*=0) and a d-axis current Id. Similarly, a q-axis deviation calculating section 61q finds a q-axis deviation ΔIq between an electric current command value Iq*, serving as a q-axis target current, and q-axis current Iq. The d-axis deviation ΔId is subjected to calculating processing by a d-axis F/B control section 62d, and a d-axis voltage command value Vd* is output from the d-axis F/B control section 62d. Also, the q-axis deviation ΔIq is subjected to calculating processing by a q-axis F/B control section 62q, and a q-axis voltage command value Vq* is output from the q-axis F/B control section 62q.

The two-phase/three-phase converting section 63 converts the d-axis voltage command value Vd* and q-axis voltage command value Vq* into coordinates based on the motor rotation angle θm. Thereby, the two-phase-/three-phase converting section 63 calculates voltage command values Vu*, Vv*, and Vw*, respectively corresponding to the U-phase winding, V-phase winding, and W-phase winding.

The PWM converting section 64 generates a PWM control signal for each phase, which is a pulse signal. The PWM control signals for the corresponding phases have duty ratios Du, Dv, and Dw, respectively corresponding to the voltage command values Vu*, Vv*, and Vw*. A PWM output section 65 converts PWM control signals for the corresponding phases, which have been generated in the PWM converting section 64, into signal levels able to be input to the gate driver circuit 31, and thereby generates motor control signals.

Thus, based on the electric current command value Iq*, phase current values Iu, Iv, and Iw and motor rotation angle θm, the output section 36 exerts electric current feedback control in the d/q coordinate system. Then, a motor control signal determined based on the electric current feedback control is output to the gate driver circuit 31 from the output section 36. Consequently, voltages corresponding to the d-axis voltage command value Vd* and q-axis voltage command value Vq* are applied to the three-phase winding of the motor 12 from the inverter device 32, thereby rotating the motor 12.

Next, a control flow for assist control by the abnormality determining section 37 will be described referring to FIG. 7. The control flow is repeated at predetermined sampling period.

Figure 7:
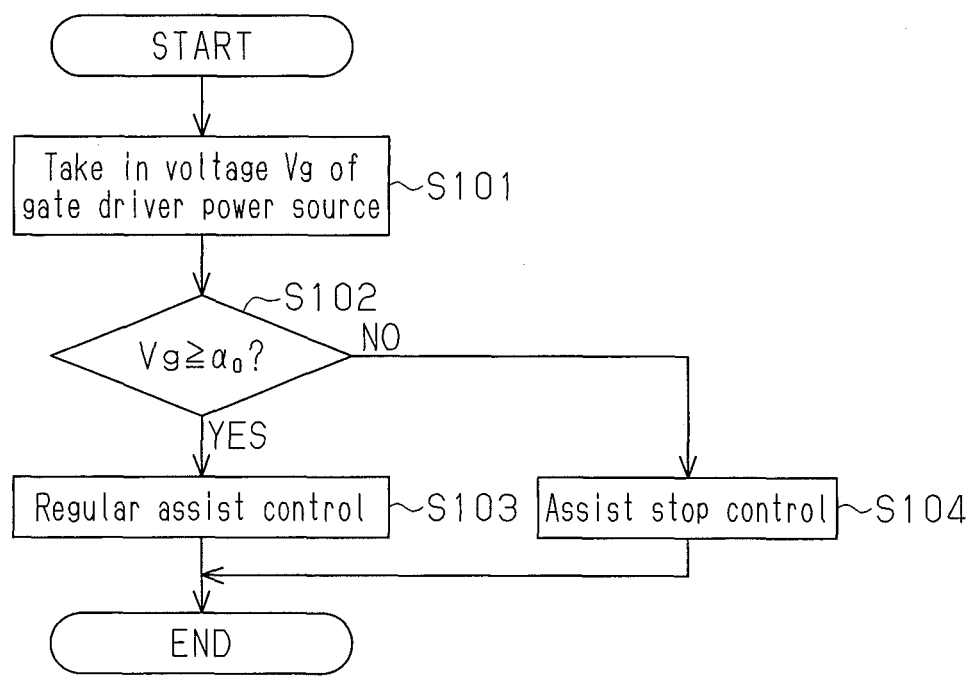
FIG. 7 is a flowchart illustrating control exerted by an abnormality determining section of the electric power steering apparatus.

As shown FIG. 7, first, the microcomputer 16 takes in the voltage Vg of the gate driver power source 29 (step S101). Next, the microcomputer 16 determines whether or not the voltage Vg of the gate driver power source 29 is equal to or higher than the voltage threshold value $α_0$ (step S102). If the voltage Vg of the gate driver power source 29 is equal to or higher than the voltage threshold value $α_0$ (step S102: YES), the microcomputer 16 determines that the voltage Vg is normal. Then, based on the result of the determination, the microcomputer 16 connects the contact points 52a and 52c of the switching section 52, exerts regular assist control (step S103), and thereby ends the control flow.

If the voltage Vg of the gate driver power source 29 is lower than the voltage threshold value $α_0$ (step S102: NO), the microcomputer 16 determines that the voltage Vg of the gate driver power source 29 is lower than a normal value. Then, based on the result of the determination, the microcomputer 16 connects the contact points 52n and 52c of the switching section 52, exerts assist stop control (step S104), and thereby ends the control flow.

According to the foregoing first embodiment, advantageous effects as described below can be obtained.

(1) If the voltage Vg of the gate driver power source 29 is equal to or higher than the voltage threshold value $α_0$, the microcomputer 16 determines that the voltage Vg is normal and exerts regular assist control. Conversely, if the voltage Vg is lower than the voltage threshold value $α_0$, the microcomputer 16 determines that the voltage Vg is lower than the normal value and exerts assist stop control.

With this configuration, based on the voltage Vg of the gate driver power source 29, switching between assist control and assist stop control can be exerted. With thus determining the state of the voltage of the gate driver power source 29, in a case where any other factor than abnormality in the voltage of the gate driver power source 29 is detected, for example, where only one phase of the motor 12 is disconnected, but assist control using the remaining normal phases is possible, assist control can be continued. Therefore, depending on a factor of abnormality in the motor control, switching between assist control and assist stop control can be exerted appropriately.

Additionally, with this configuration, the voltage decrease of the gate driver power source 29 can be determined based on the voltage threshold value $α_0$. That is, by dividing the voltage of the gate driver power source 29 into an area of normal voltage and an area of voltage lower than the normal value, control of switching between assist control and assist stop control can be exerted more accurately.

Second Embodiment

Next, referring to FIGS. 8 to 10, the second embodiment according to the present invention will be described. In the second embodiment, detailed descriptions of parts identical to those in the first embodiment are omitted.

Figure 8:
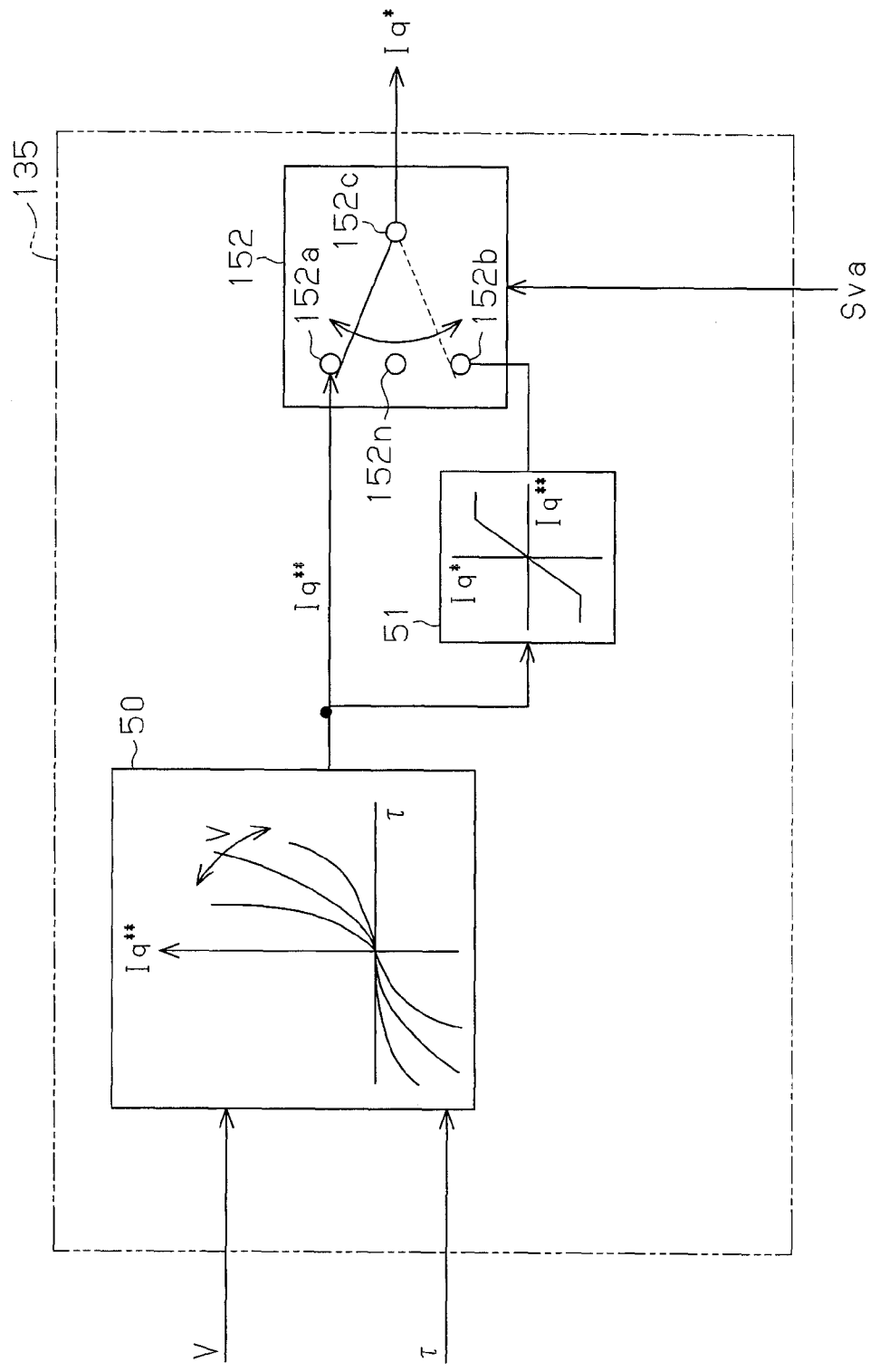
FIG. 8 is a block diagram of the electrical configuration of a calculating section of an electric power steering apparatus according to the second embodiment of the present invention.
Figure 9:
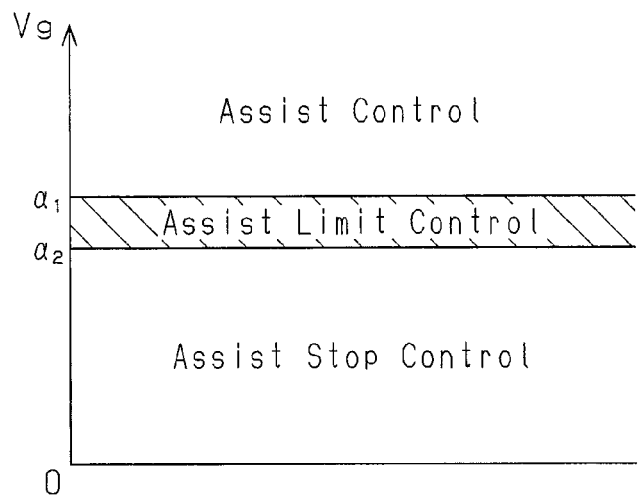
FIG. 9 is a graph showing an area of voltage where assist control is exerted, an area of voltage where assist limit control is exerted, and an area of voltage where assist stop control is exerted.

As shown in FIG. 8, a calculating section 135 includes a limiting map 51 that limits an electric current command value Iq output from a calculation map 50. A switching section 152 includes a contact point 152a connected to the calculation map 50, a contact point 152n connected to a command value memory, a contact point 152b connected to a limiting map 51, and a contact point 152c connected to an output section 36. Based on the state of the voltage Vg of a gate driver power source 29, the switching section 152 is switched as follows. If the voltage Vg of the gate driver power source 29 is equal to or higher than a first voltage threshold value $α_1$, the switching section 152 connects a contact point 152a and a contact point 152c. Consequently, the electric current command value Iq output from the calculation map 50 is output from the calculating section 135 to the output section 36 as it is, as an electric current command value Iq*.

Conversely, if the voltage Vg is higher than a second voltage threshold value $\alpha_2$ but lower than the first voltage threshold value $\alpha_1$, the switching section 152 connects the contact point 152b and contact point 152c. Consequently, the electric current command value Iq** output from the calculating map 50 is limited to a predetermined level by the limiting map 51. Then, the limited electric current command value Iq* is output from the calculating section 135 to the output section 36, as an electric current command value Iq* (assist limit control). If the voltage Vg is equal to or lower than the second voltage threshold value $\alpha_2$, the switching section 152 connects the contact point 152c and contact point 152n. Consequently, the electric current command value Iq** (=0) output from the command value memory is output from the calculating section 135 to the output section 36, as an electric current command value Iq* (assist stop control).

Next, referring to FIG. 10, control flow for assist control by an abnormality determining section 37 will be described.

Figure 10:
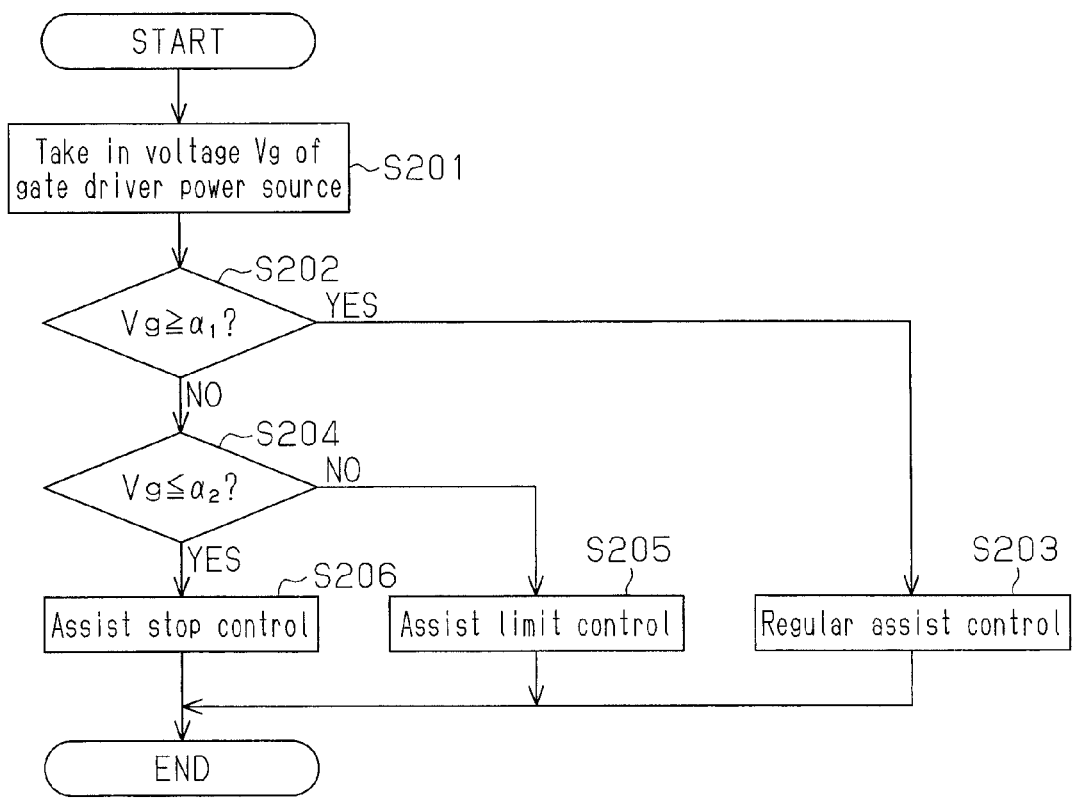
FIG. 10 is a flowchart illustrating control exerted by an abnormality determining section of the electric power steering apparatus.

As shown in FIG. 10, first, a microcomputer 16 takes in the voltage Vg of the gate driver power source 29 (step S201). Next, the microcomputer 16 determines whether or not the voltage Vg of the gate driver power source 29 is equal to or higher than the first voltage threshold value $\alpha_1$ (step S202). If the voltage Vg is equal to or higher than the first voltage threshold value $\alpha_1$ (step S202: YES), the microcomputer 16 determines that the voltage Vg is normal. Then, based on the result of the determination, the microcomputer 16 connects the contact points 152a and 152c of the switching section 152, exerts regular assist control (step S203), and thereby ends control flow.

Conversely, if the voltage Vg is lower than the first voltage threshold value $\alpha_1$ (step S202: NO), the microcomputer 16 determines whether or not the voltage Vg is equal to or lower than the second voltage threshold value $\alpha_2$ (step S204). If the voltage Vg is higher than the voltage threshold value $\alpha_2$ (step S204: YES), the microcomputer 16 determines that the voltage Vg of the gate driver power source 29 is slightly lower than a normal value. Then, based on the result of the determination, the microcomputer 16 connects the contact points 152b and 152c of the switching section 152, exerts assist limit control (step S205), and thereby ends control flow.

Conversely, if the voltage Vg is equal to or lower than the second voltage threshold value $\alpha_2$ (step 204: NO), the microcomputer 16 determines that the voltage Vg of the gate driver power source 29 is significantly lower than the normal value. Then, based on the result of the determination, the microcomputer 16 connects the contact points 152n and 152c of the switching section 152, exerts assist stop control (step S206), and thereby ends control flow.

According to the foregoing second embodiment, advantageous effects as described below can be obtained.

(2) In the EPS 1, in an area of voltage where the voltage of the gate driver power source 29 is slightly lower than the normal value, FETs of an inverter device 32 become unsaturated. If electric current flows in a motor 12 continuously in this state, the FETs may overheat, leading to malfunction.

In this regard, according to the second embodiment, if the voltage Vg of the gate driver power source 29 is equal to or higher than the first threshold value $\alpha_1$, the microcomputer 16 determines that the voltage Vg is normal, and exerts regular assist control. If the voltage Vg is higher than the second voltage threshold value $\alpha_2$ but lower than the first voltage threshold value $\alpha_1$, the microcomputer 16 determines that the voltage Vg is slightly lower than the normal value, and exerts assist limit control. Further, if the voltage Vg is equal to or lower than the second voltage threshold value $\alpha_2$, the microcomputer 16 determines that the voltage Vg is significantly lower than the normal value, and exerts assist stop control.

In this configuration, in the area where the voltage Vg of the gate driver power source 29 is slightly lower than a normal value, the microcomputer 16 exerts assist limit control, thereby restricting the values of phase currents flowing in the motor 12 and enabling continued application of assist force. Thus, the FETs, which are semiconductor switching elements of the inverter device 32, are prevented from overheating, which may lead to a malfunction, and application of assist force can be continued.

Additionally, in this configuration, the state of the voltage Vg of the gate driver power source 29 can be determined based on the first voltage threshold value $\alpha_1$ and the second voltage threshold value $\alpha_2$ set lower than the first one. That is, by dividing the voltage Vg of the gate driver power source 29 into an area of normal voltage, an area of voltage slightly lower than a normal value, and an area of voltage significantly lower than the normal value, control of switching between assist control, assist limit control, and assist stop control can be exerted more accurately.

Third Embodiment

Next, referring to FIG. 4 and FIGS. 11 to 14, the third embodiment according to the present invention will be described. In the third embodiment, detailed descriptions of parts identical to those in the first embodiment are omitted.

Figure 11:
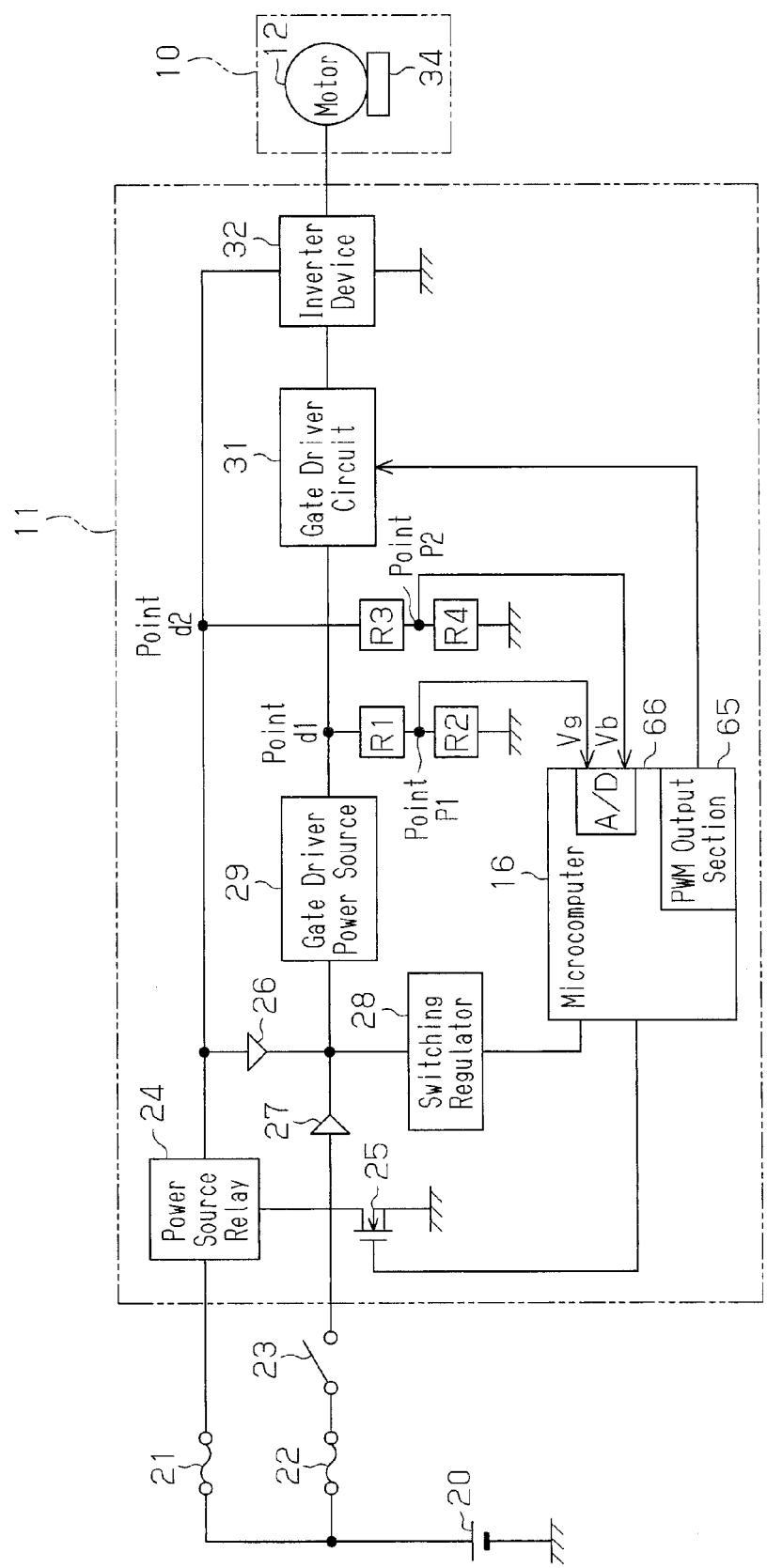
FIG. 11 is a block diagram of the power source configuration of an electric power steering apparatus according to the third embodiment of the present invention.

As shown in FIG. 11, the power source voltage Vb of an inverter device 32 is taken into an A/D terminal 66 of a microcomputer 16 from a point d2, which is midway between a power source relay 24 and the inverter device 32, after divided by voltage dividing resistances R3 and R4. Also, the voltage Vg of a gate driver power source 29 is taken into the A/D terminal 66 from a point d1, which is midway between the gate driver power source 29 and a gate driver circuit 31, after divided by voltage dividing resistances R1 and R2.

Figure 12:
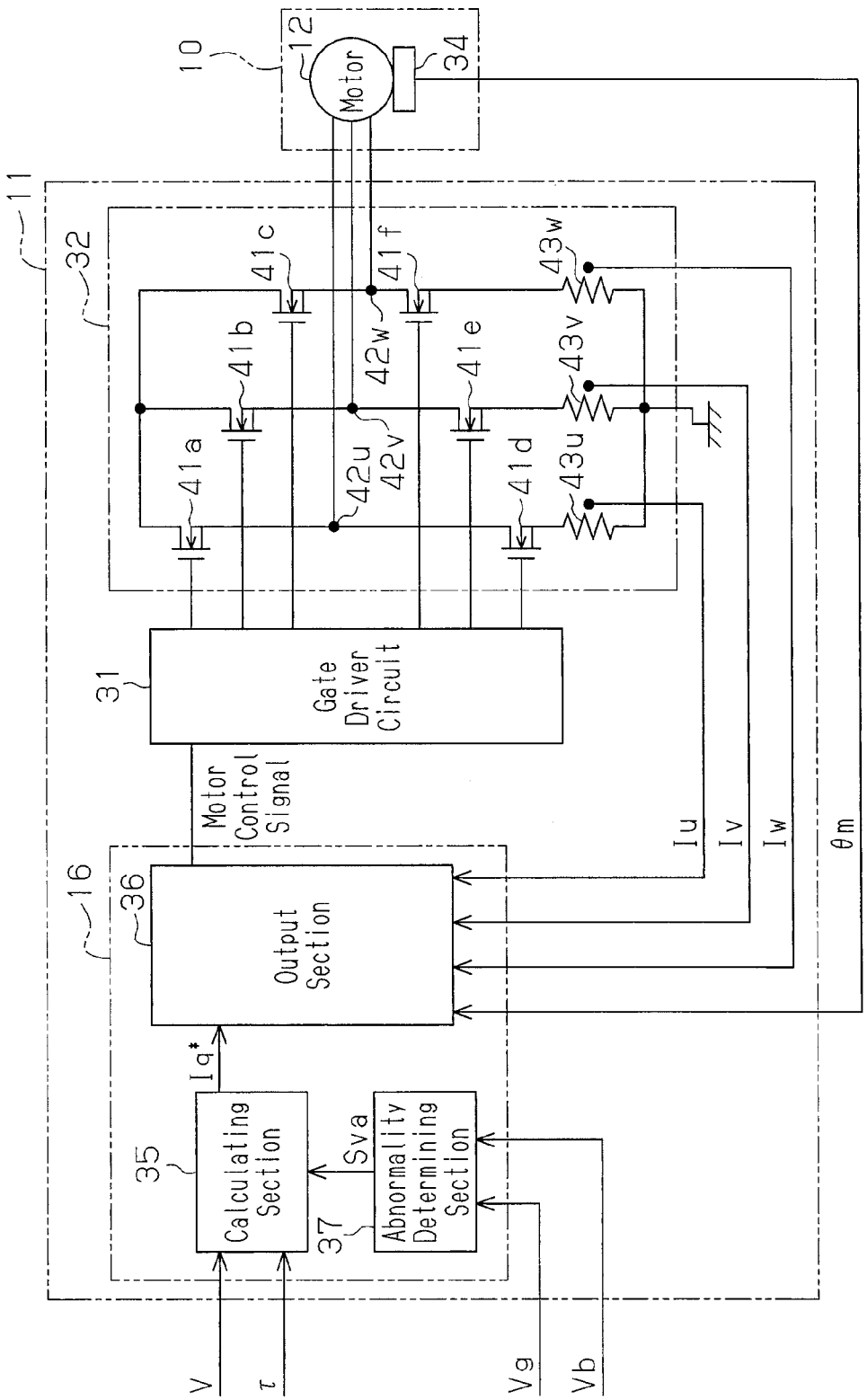
FIG. 12 is a block diagram of the electrical configuration of the electric power steering apparatus.

As shown in FIG. 12, based on a difference between the voltage Vg of the gate driver power source 29 and the power source voltage Vb of the inverter device 32, which are taken into the A/D terminal 66, an abnormality determining section 37 determines the state of the voltage Vg of the gate driver power source 29 with respect to the power source voltage Vb of the inverter device 32. Specifically, the abnormality determining section 37 determines whether or not the difference between the voltage Vg and the power source voltage Vb is equal to or greater than a voltage threshold value $\beta_0$. Then, based on the result of the determination, the abnormality determining section 37 generates a switching signal Sva for switching an electric current command value Iq* output from a calculating section 35 to an output section 36, and outputs this switching signal to the calculating section 35.

Figure 13:
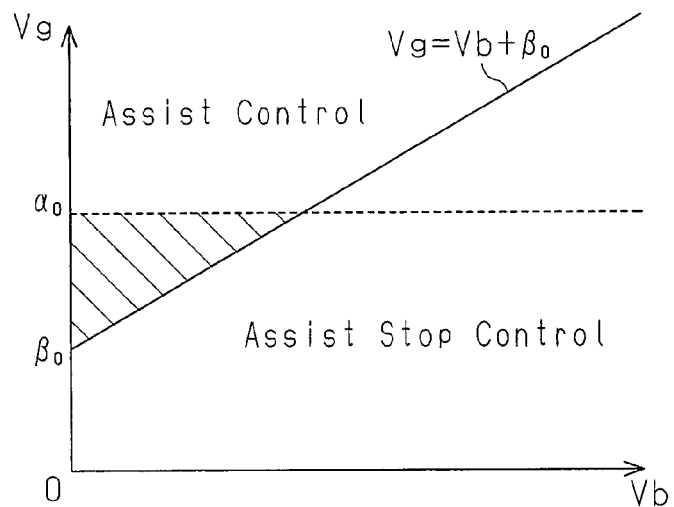
FIG. 13 is a graph showing an area of voltage where assist control is exerted and an area of voltage where assist stop control is exerted.

As shown in FIGS. 4 and 13, based on the state of the voltage Vg of the gate driver power source 29 with respect to the power source voltage Vb of the inverter device 32, a switching section 52 is switched as follows. If a difference between the voltage Vg and power source voltage Vb is equal to or greater than the voltage threshold value $\beta_0$, the switching section 52 connects a contact point 52a and a contact point 52c. Consequently, an electric current command value Iq** output from a calculation map 50 is output from the calculating section 35 to the output section 36 as it is, as an electric current command value Iq*.

Conversely, if a difference between the voltage Vg and the power source voltage Vb is less than the voltage threshold value $\beta_0$, the switching section 52 connects the contact point 52n and the contact point 52c. Consequently, an electric current command value Iq (=0) output from a command value memory is output from the calculating section 35 to the output section 36**, as an electric current command value Iq* (assist stop control).

Next, referring to FIG. 14, a control flow for assist control by the abnormality determining section 37 will be described.

Figure 14:
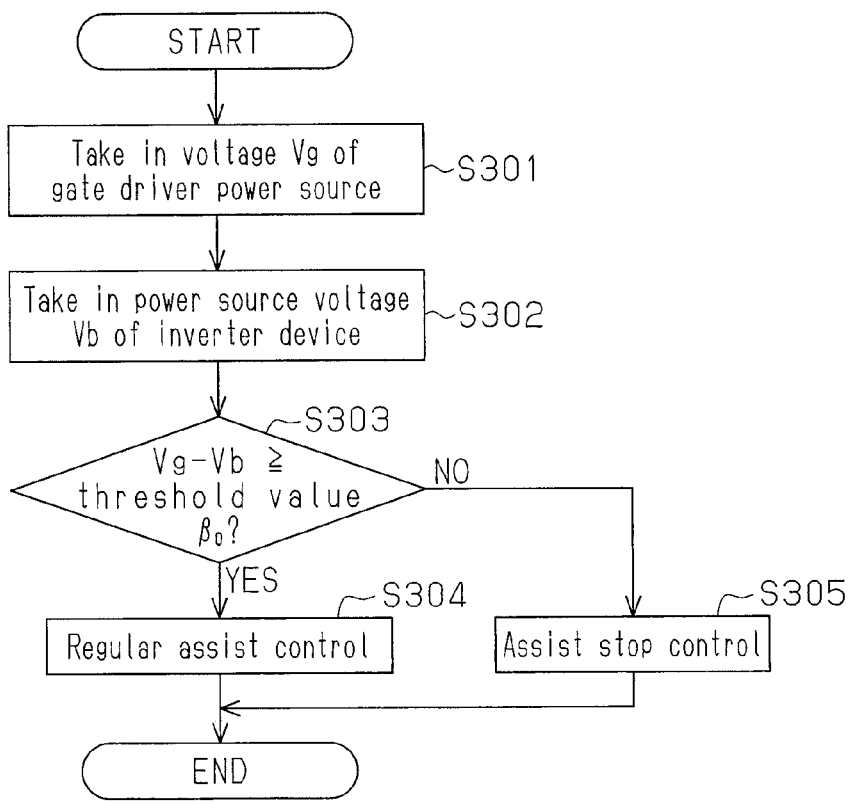
FIG. 14 is a flowchart illustrating control exerted by an abnormality determining section of the electric power steering apparatus.

As shown in FIG. 14, first, a microcomputer 16 takes in the voltage Vg of the gate driver power source 29 (step S301). Next, the microcomputer 16 takes in the power source voltage Vb of the inverter device 32 (step S302). Subsequently, the microcomputer 16 determines whether or not a difference between the voltage Vg and the power source voltage Vb is equal to or greater than the voltage threshold value $\beta_0$ (step S303). If the difference between the voltage Vg and power source voltage Vb is equal to or greater than the voltage threshold value $\beta_0$ (step S303: YES), the microcomputer 16 determines that the voltage Vg is maintained at a sufficiently high level with respect to the power source voltage Vb and is, therefore, normal. Based on the result of the determination, the microcomputer 16 connects the contact points 52a and 52c of the switching section 52, exerts regular assist control (step S304), and thereby ends control flow.

If the difference between the voltage Vg and power source voltage Vb is less than the voltage threshold value $\beta_0$ (step S303: NO), the microcomputer 16 determines that the voltage Vg is not maintained at a sufficiently high level with respect to the power source voltage Vb and is, therefore, lower than a normal value. Then, based on the result of the determination, the microcomputer 16 connects the contact points 52n and 52c of the switching section 52, exerts assist stop control (step S305), and thereby ends control flow.

According to the foregoing third embodiment, advantageous effects as described below can be obtained.

(3) In the first and second embodiments, to determine the state of the voltage Vg of the gate driver power source 29, the voltage Vg of the gate driver power source 29 alone is used, without taking the power voltage Vb of the inverter device 32 into consideration. That is, if the voltage Vg is lower than the voltage threshold value $\alpha_0$ or equal to or less than the second threshold value $\alpha_2$, assist stop control is exerted without exception, regardless of the value of the power source voltage Vb.

In these configurations, while it can be determined to a certain degree whether the voltage Vg of the gate driver power source 29 is higher or lower than a normal value, assist stop control may be exerted even in an area of voltage where the inverter device 32 can be driven. For example, in the area of voltage indicated by the shaded portion in FIG. 13, the voltage Vg is higher than the power source voltage Vb by the voltage threshold value $\beta_0$. Therefore, while the inverter device 32 is able to be driven, assist stop control is exerted due to the voltage Vg lower than the voltage threshold value $\alpha_0$.

In this regard, according to the third embodiment, if the difference between the voltage Vg of the gate driver power source 29 and the power source voltage Vb of the inverter device 32 is equal to or greater than the voltage threshold value $\beta_0$, the microcomputer 16 determines that the voltage Vg is maintained at a sufficiently high level with respect to the power source voltage Vb and is, therefore, normal. Then, based on the result of the determination, the microcomputer 16 exerts regular assist control. Conversely, if a difference between the voltage Vg and the power source voltage Vb is less than the voltage threshold value $\beta_0$, the microcomputer 16 determines that the voltage Vg is not maintained at a sufficiently high level with respect to the power source voltage Vb and is, therefore, less than a normal value. Then, based on the result of the determination, the microcomputer 16 exerts assist stop control.

In this configuration, an indication of a decrease in the voltage Vg of the gate driver power source 29 is given by the difference between the voltage Vg of the gate driver power source 29 and the power source voltage Vb of the inverter device 32. Therefore, the state of the voltage Vg of the gate driver power source 29 can be determined based on whether or not the voltage Vg of the gate driver power source 29 is maintained at a sufficiently higher level than the power source voltage Vb of the inverter device 32, that is, whether or not the voltage Vg of the gate driver power source 29 is a voltage at which the inverter device 32 can be driven. Therefore, an area of voltage where assist control is possible can be broadened, in comparison with the case of switching between assist control and assist stop control based on only the voltage Vg of the gate driver power source 29. Thus, according to any factor of abnormality in motor control, control of switching between assist control and assist stop control can be exerted more accurately.

Additionally, in this configuration, any decrease in the voltage Vg of the gate driver power source 29 with respect to the power source voltage Vb of the inverter device 32 can be determined based on the voltage threshold value $\beta_0$. That is, by dividing the voltage Vg of the gate driver power source 29 with respect to the power source voltage Vb of the inverter device 32 into the area of normal voltage and the area of voltage lower than a normal value, control of switching between assist control and assist stop control can be exerted more accurately.

Fourth Embodiment

Figure 15:
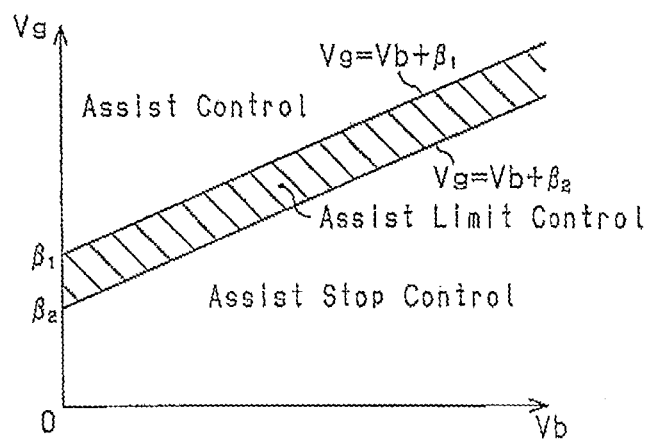
FIG. 15 is a graph showing respective areas of voltage where assist control, assist limit control, and assist stop control are respectively exerted in an electric power steering apparatus according to the fourth embodiment of the present invention.
Figure 16:
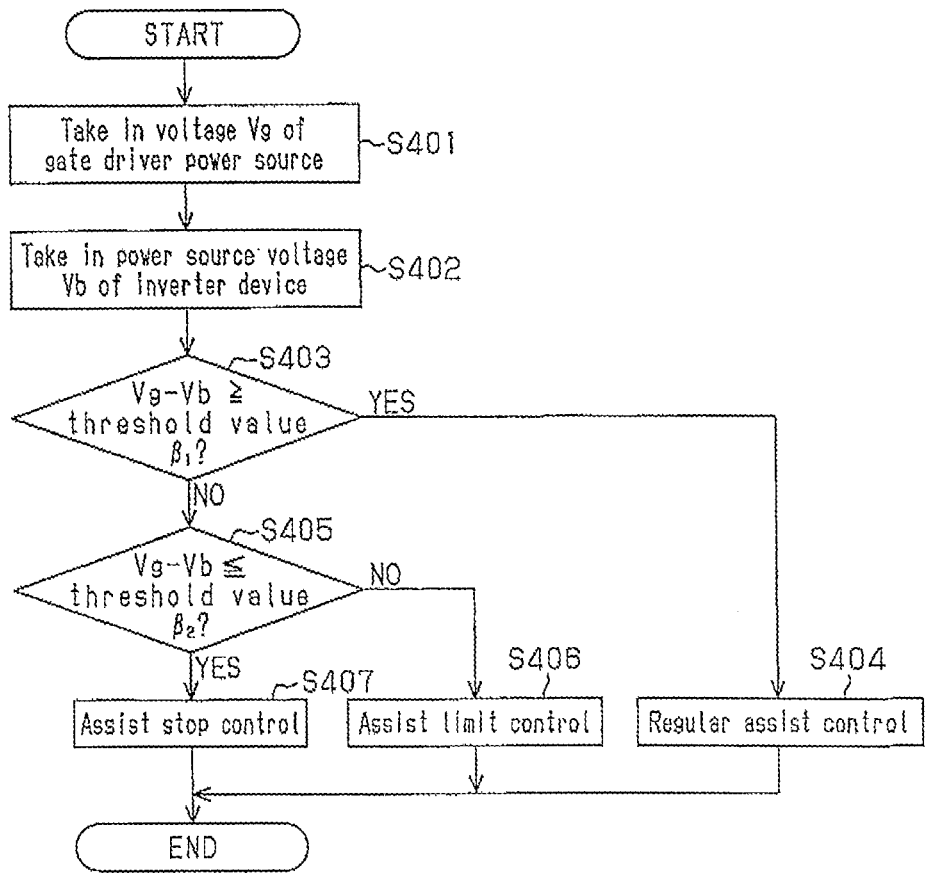
FIG. 16 is a flowchart illustrating control exerted by an abnormality determining section of the electric power steering apparatus.

Referring to FIGS. 8, 15, and 16, the fourth embodiment according to the present invention will be described below. In the fourth embodiment, detailed descriptions of parts identical to those in the third embodiment are omitted.

As shown in FIGS. 8 and 15, based on the state of the voltage Vg of a gate driver power source 29 with respect to the power source voltage Vb of an inverter device 32, a switching section 152 is switched as follows. If a difference between the voltage Vg and the power source voltage Vb is equal to or greater than a first voltage threshold value $\beta_1$, the switching section 152 connects a contact point 152a and a contact point 152c. Consequently, an electric current command value Iq output from a calculation map 50 is output from a calculating section 135 to an output section 36** as it is, as an electric current command value Iq*.

Conversely, if a difference between the voltage Vg and the power source voltage Vb is greater than a second voltage threshold value $\beta_2$ but less than the first voltage threshold value $\beta_1$, the switching section 152 connects the contact point 152b and the contact point 152c. As a result, the electric current command value Iq output from the calculation map 50 is limited to a predetermined level by a limiting map 51**. Then, the limited electric current command value Iq* is output from the calculating section 135 to the output section 36 as an electric current command value Iq*. If the difference between the voltage Vg and power source voltage Vb is equal to or less than the second voltage threshold value $\beta_2$, the switching section 152 connects the contact point 152c and a contact point 152n. Consequently, an electric current command value Iq** (=0) output from a command value memory is output from the calculating section 135 to the output section 36, as an electric current command value Iq* (assist stop control).

Next, referring to FIG. 16, control flow for assist control by an abnormality determining section 37 will be described.

As shown in FIG. 16, first, a microcomputer 16 takes in the voltage Vg of the gate driver power source 29 (step S401). Next, the microcomputer 16 takes in the power source voltage Vb of the inverter device 32 (step S402). Subsequently, the microcomputer 16 determines whether or not a difference between the voltage Vg and the power source voltage Vb is equal to or greater than the first voltage threshold value $\beta_1$ (step S403). If the difference between the voltage Vg and power source voltage Vb is equal to or greater than the first voltage threshold value $\beta_1$ (step S403: YES), the microcomputer 16 determines that the voltage Vg is maintained at a sufficiently high level with respect to the power source voltage Vb and is, therefore, normal. Then, based on the result of the determination, the microcomputer 16 connects the contact point 152a and the contact point 152c of the switching section 152, exerts regular assist control (step S404), and thereby ends control flow.

If the difference between the voltage Vg and the power source voltage Vb is less than the first voltage threshold value $\beta_1$ (step S403: NO), the microcomputer 16 determines whether the difference between the Vg and power source voltage Vb is equal to or less than the second voltage threshold value $\beta_2$ (step S405). If the difference between the voltage Vg and power source voltage Vb is greater than the second voltage threshold value $\beta_2$ (step S405: NO), the microcomputer 16 determines that the voltage Vg is not maintained at a sufficiently high level with respect to the power source voltage Vb and is slightly less than a normal value. Then, based on the result of the determination, the microcomputer 16 connects the contact points 152b and 152c of the switching section 152, exerts assist limit control (step S406), and thereby ends control flow.

Conversely, if the difference between the voltage Vg and power source voltage Vb is equal to or less than the second voltage threshold value $\beta_2$ (step 405: YES), the microcomputer 16 determines that the voltage Vg is not maintained at a sufficiently high level with respect to the power source voltage Vb and is significantly less than a normal value. Then, based on the result of the determination, the microcomputer 16 connects the contact points 152n and 152c of the switching section 152, exerts assist stop control (step S407), and thereby ends control flow.

The foregoing fourth embodiment can yield the same advantageous effects as those of the second and third embodiments.

Each embodiment described above can be modified as described below.

In the second embodiment, if the voltage Vg of the gate driver power source 29 with respect to the power source voltage Vb of the inverter device 32 is higher than the second voltage threshold value $\alpha_2$ but lower than the first voltage threshold value $\alpha_1$, the microcomputer 16 exerts assist limit control to prevent overheating of FETs. Instead of this, switching loss may be reduced by decreasing the drive frequency of each FET. In this case, the power source voltage Vb of the inverter device 32 can be decreased to maintain the saturated state of the FET even if the voltage of the gate driver power source 29 decreases. This modification also applies to the fourth embodiment.

In the second embodiment, assist limit control is exerted using both the limiting map 51 that limits the electric current command value Iq** output from the calculation map 50, and the switching section 52 that switches the electric current command value Iq* in response to a switching signal Sva. However, assist limit control is not limited to such a configuration. For example, instead of the limiting map 51, a limit-value limiting map may be provided, which has a limit value proportional to the voltage of the gate driver power source 29. In this case, a selecting section may be provided for comparing an electric current command limit value output from the limit-value limiting map, and an electric current command value Iq**, and selecting a smaller one. Assist limit control in such a configuration also prevents overheating of FETs.

In the third embodiment, as an indication of a decrease in the voltage Vg of the gate driver power source 29, a difference between the voltage Vg of the gate driver power source 29 and the power source voltage Vb of the inverter device 32 is used. However, the ratio of the voltage Vg of the gate driver power source 29 to the power source voltage Vb of the inverter device 32 may be used. In this case, assist control may be exerted on condition that a value calculated from the voltage Vg/power source voltage Vb is equal to or higher than a specific value, and assist stop control may be exerted on condition that the value is less than the specific value. Similarly, in the fourth embodiment, switching between assist control, assist limit control, and assist stop control may be carried out using the ratio of the voltage Vg of the gate driver power source 29 to the power source voltage Vb of the inverter device 32.

In each of the first to fourth embodiments, a brushless DC motor is used as a drive source for the EPS actuator 10, and an inverter device is used for driving the brushless DC motor. However, a brush DC motor may be used instead of the brushless DC motor. In this case, an H bridge circuit may be included to drive the brush DC motor.

In each of the first to fourth embodiments, the present invention is implemented in the EPS 1 of column type. However, the present invention may be applied to an EPS of pinion or rack assist type. Additionally, the present invention maybe applied in, for example, a numerical control device for a machine tool, or a control device for a robot.

The invention claimed is:
1. An electric power steering apparatus comprising:
a motor configured to apply assist force to a steering system;
a torque sensor configured to detect steering torque applied to the steering system;
an inverter device including a semiconductor switching element and configured to drive the motor by driving the semiconductor switching element;
a gate driver power source configured to supply power to a gate drive circuit that drives the inverter device; and
a controller configured to control the inverter device based on the steering torque, wherein based on an indication of a voltage decrease in the gate driver power source, the controller switches assist control, for applying the assist force to the steering system, to assist stop control, for stopping the assist control,
wherein the indication of the voltage decrease in the gate driver power source is given by a difference between the voltage of the gate driver power source and a power source voltage of the inverter device; and
if the voltage of the gate driver power source is equal to or higher than a voltage threshold value with respect to the power source voltage of the inverter device, the control- ler exerts assist control, and if the voltage of the gate driver power source is not equal to or higher than the voltage threshold value with respect to the power source voltage of the inverter device, the controller exerts assist stop control.

2. The electric power steering apparatus according to claim 1, wherein:

the controller exerts assist limit control in which assist control is exerted while limiting an electric current command value corresponding to a target assist force; and the controller exerts the assist limit control based on the indication of the voltage decrease in the gate driver power source.

3. The electric power steering apparatus according to claim 2, wherein the controller exerts assist control if the indication of the voltage decrease in the gate driver power source is equal to or higher than a first voltage threshold value, exerts assist limit control if the indication is less than the first voltage threshold value but greater than a second voltage threshold value that is smaller than the first voltage threshold value, and exerts assist stop control if the indication is equal to or less than the second voltage threshold value.

4. The electric power steering apparatus according to claim 1, wherein the controller decreases drive frequency of the semiconductor switching element based on the indication of the voltage decrease in the gate driver power source.

5. An electric power steering apparatus comprising:

a motor-configured to a assist force to a steering system;

a torque sensor configured to detect steering torque applied to the steering system;

an inverter device including a semiconductor switching element and configured to drive the motor by driving the semiconductor switching element;

a gate driver power source configured to supply power to a gate drive circuit that drives the inverter device; and a controller configured to control the inverter device based on the steering torque, wherein based on an indication of a voltage decrease in the gate driver power source, the controller switches assist control, for applying the assist force to the steering system, to assist stop control, for stopping the assist control, wherein the controller decreases a power source voltage of the inverter device based on the indication of the voltage decrease in the gate driver power source.

6. The electric power steering apparatus according to claim 5, wherein:

the indication of the voltage decrease in the gate driver power source is given by the voltage of the gate driver power source; and if the voltage of the gate driver power source is equal to or higher than a voltage threshold value, the controller exerts assist control, and if the voltage of the gate driver power source is lower than the voltage threshold value, the controller exerts assist stop control.

\* \* \* \* \*